(12) United States Patent
Yamaguchi et al.

(10) Patent No.: US 10,352,244 B2
(45) Date of Patent: Jul. 16, 2019

(54) COMBUSTOR COOLING STRUCTURE

(71) Applicant: MITSUBISHI HITACHI POWER SYSTEMS, LTD., Yokohama-shi, Kanagawa (JP)

(72) Inventors: Yoshiaki Yamaguchi, Tokyo (JP); Satoshi Mizukami, Tokyo (JP); Tomoyuki Hirata, Tokyo (JP); Junichiro Masada, Tokyo (JP); Tetsu Konishi, Tokyo (JP); Kazumasa Takata, Tokyo (JP); Hiroyuki Yamazaki, Sendai (JP); Takuya Suzuki, Sendai (JP); Shinya Ishikawa, Miyagi-gun (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 323 days.

(21) Appl. No.: 15/306,423

(22) PCT Filed: Apr. 25, 2014

(86) PCT No.: PCT/JP2014/061785
§ 371 (c)(1),
(2) Date: Oct. 24, 2016

(87) PCT Pub. No.: WO2015/162795
PCT Pub. Date: Oct. 29, 2015

(65) Prior Publication Data
US 2017/0044981 A1 Feb. 16, 2017

(51) Int. Cl.
*F23R 3/06* (2006.01)
*F23R 3/00* (2006.01)
(Continued)

(52) U.S. Cl.
CPC .................. *F02C 7/18* (2013.01); *F02C 3/14* (2013.01); *F23R 3/005* (2013.01); *F23R 3/06* (2013.01);
(Continued)

(58) Field of Classification Search
CPC ...... F02C 3/14; F02C 7/08; F02C 7/18; F02C 7/24; F23R 3/005; F23R 3/06; F23R 3/42; F01D 9/023
See application file for complete search history.

(56) References Cited

U.S. PATENT DOCUMENTS 5,394,687 A    3/1995  Chen et al.
5,782,076 A    7/1998  Huber et al.
(Continued)

FOREIGN PATENT DOCUMENTS

JP    S52-13015 A      2/1977
JP    2002-155759 A    5/2002
(Continued)

OTHER PUBLICATIONS

Notification of Transmittal of Translation of the International Preliminary Report on Patentability (Form PCT/IB/338) issued in counterpart International Application No. PCT/JP2014/061785 dated Nov. 3, 2016 with Forms PCT/IB/373, PCT/ISA/237 and PCT/ISA/210. (18 pages).

(Continued)

*Primary Examiner* — Todd E Manahan
*Assistant Examiner* — Eric W Linderman
(74) *Attorney, Agent, or Firm* — Westerman, Hattori, Daniels & Adrian, LLP

(57) ABSTRACT

A gas turbine combustor comprising a plurality of cooling air passages (27A) through which bled pressurized air flows from downstream of a combustion gas flow toward upstream, the plurality of cooling air passages (27A) being (Continued)

disposed in a wall portion (26) side by side and aligned in a flow direction of a combustion gas; wherein the plurality of cooling air passages (27A) are divided via a passage transition groove portion (33) into upstream cooling air passages (27A1) disposed closer to bled pressurized air inlet holes (30a) and downstream cooling air passages (27A2) disposed closer to bled pressurized air outlet holes (30b), and center lines ($C_1$) of the upstream cooling air passages are non-collinear with center lines ($C_2$) of the downstream cooling air passages.

4 Claims, 9 Drawing Sheets

(51) Int. Cl.
| | | |
|---|---|---|
| | *F02C 7/18* | (2006.01) |
| | *F23R 3/42* | (2006.01) |
| | *F02C 3/14* | (2006.01) |
| | *F02C 7/08* | (2006.01) |
| | *F02C 7/24* | (2006.01) |

(52) U.S. Cl.
CPC .............. *F23R 3/42* (2013.01); *F02C 7/08* (2013.01); *F02C 7/24* (2013.01); *Y02T 50/675* (2013.01)

(56) References Cited

U.S. PATENT DOCUMENTS

| | | | |
|---|---|---|---|
| 6,098,395 A | | 8/2000 | North |
| 6,282,905 B1* | | 9/2001 | Sato .................. F23R 3/002 60/752 |
| 6,295,803 B1 | | 10/2001 | Bancalari |
| 7,310,938 B2* | | 12/2007 | Marcum ............... F01D 9/023 60/39.37 |
| 9,321,943 B2* | | 4/2016 | Yamaguchi ........ C08G 18/6229 |
| 9,840,924 B2* | | 12/2017 | Hase .................. F23R 3/005 |
| 2009/0081025 A1* | | 3/2009 | Lutjen .................. F01D 11/08 415/115 |
| 2010/0170260 A1* | | 7/2010 | Mawatari ............. F23R 3/005 60/755 |
| 2010/0180601 A1* | | 7/2010 | Ishiguro .............. F23R 3/005 60/755 |
| 2012/0006518 A1* | | 1/2012 | Lee .................... F23R 3/005 165/168 |
| 2012/0034075 A1* | | 2/2012 | Hsu .................... F01D 9/023 415/178 |
| 2012/0198854 A1 | | 8/2012 | Schilp et al. |
| 2013/0098063 A1 | | 4/2013 | Mizukami et al. |
| 2013/0180691 A1* | | 7/2013 | Jost .................... B64G 1/50 165/135 |
| 2014/0144147 A1* | | 5/2014 | Kishida ............... F23R 3/06 60/754 |
| 2014/0150436 A1* | | 6/2014 | Eroglu ................ F01D 25/12 60/752 |
| 2014/0260256 A1* | | 9/2014 | Loebig ................ F02K 7/02 60/722 |
| 2014/0290255 A1* | | 10/2014 | Akagi ................. F01D 11/08 60/752 |
| 2015/0107262 A1* | | 4/2015 | Maurer ................ F01D 9/023 60/785 |
| 2015/0121879 A1* | | 5/2015 | Hirata ................. F23R 3/002 60/722 |
| 2015/0167977 A1* | | 6/2015 | Leglaye ............... F02C 7/12 60/754 |
| 2015/0377134 A1* | | 12/2015 | Maurer ................ F02C 7/18 60/754 |
| 2017/0108221 A1* | | 4/2017 | Mizukami ............ F23R 3/06 |
| 2017/0122562 A1* | | 5/2017 | Berry .................. F01D 9/023 |
| 2017/0138201 A1* | | 5/2017 | Takata ................ F02C 9/52 |
| 2017/0254267 A1* | | 9/2017 | Mizukami ............ F02C 7/18 |
| 2017/0292389 A1* | | 10/2017 | Lorstad .............. B23K 26/21 |
| 2017/0370235 A1* | | 12/2017 | Konishi ............... F02C 7/18 |
| 2018/0038594 A1* | | 2/2018 | Shibata ............... F02C 7/18 |
| 2018/0073738 A1* | | 3/2018 | Rasmusson ......... F23R 3/005 |

FOREIGN PATENT DOCUMENTS

| | | |
|---|---|---|
| JP | 2003-214185 A | 7/2003 |
| JP | 2003-227411 A | 8/2003 |
| JP | 2005-61333 A | 3/2005 |
| JP | 2008-274774 A | 11/2008 |
| JP | 2009-79484 A | 4/2009 |
| JP | 2009-85222 A | 4/2009 |
| JP | 2012-47181 A | 3/2012 |
| JP | 2012-77660 A | 4/2012 |
| JP | 2014-98352 A | 5/2014 |
| WO | 2009/041436 A1 | 4/2009 |
| WO | 2012/043073 A1 | 4/2012 |

OTHER PUBLICATIONS

Office Action dated Jun. 28, 2016, issued in counterpart Japanese Patent Application No. 2012-250859, with English translation (7 pages).

* cited by examiner

COMBUSTOR COOLING STRUCTURE

TECHNICAL FIELD

The present invention relates to a gas turbine combustor and a gas turbine provided with the gas turbine combustor.

BACKGROUND ART

In gas turbine combustors, combustion gas flowing through the inside thereof can cause the wall temperature to exceed the tolerable temperature of its material. To prevent this, a cooling structure is provided. Many examples of such a cooling structure of a gas turbine combustor are known that employ a method of cooling by passing a cooling medium, such as compressed air or steam, to the wall portion.

One such example is the technology described in Patent Document 1. The technology described is a closed air cooling cycle cooling structure wherein, as illustrated in FIGS. 6A to 6E, compressed air supplied from a compressor (not illustrated) is bled from the side upstream of a combustor 100 and this pressurized bled pressurized air Ab is used to cool a wall portion (wall) 101. Thereafter, the bled pressurized air Ab is recovered and reused as combustion air for the combustion of fuel in the combustor 100 together with the main flow of compressed air.

The wall portion 101 of the combustor 100 (specifically a wall portion of a combustor basket) is wall cooled by cooling air being supplied to an internally formed cooling air passage. This wall portion 101 is divided into two regions: a downstream wall region Da closer to the turbine, which is cooled by passing the bled pressurized air Ab as cooling air through a cooling air passage 102A from the downstream side to the upstream side of the combustion gas flow F; and an upstream wall region Ua closer to a burner, which is cooled by passing bled compressed air Ac, which is bled from the main flow of the compressed air flowing through a casing inner space, as cooling air through a cooling air passage 102B to an acoustic liner and a damper 103.

Accordingly, a gas turbine combustor including such a closed air cooling cycle cooling structure is capable of effectively utilizing the compressed air supplied from the compressor, performing wall cooling in the combustor 100 on the side closer to the turbine having relatively high temperatures using the bled pressurized air Ab, and performing wall cooling on the side closer to the burner having relatively low temperatures using the bled compressed air Ac.

As a result, the bled pressurized air Ab that cools the downstream wall region Da of the combustor 100 and the bled compressed air Ac that cools the upstream wall region Ua of the combustor 100 are effectively reused as combustion air. This results in a gas turbine combustor including a cooling structure that is capable of reducing the usage amount of bled pressurized air Ab, which needs to be pressurized, and efficiently cooling the wall of the combustor 100.

CITATION LIST

Patent Documents

Patent Document 1: Japanese Unexamined Patent Application Publication No. 2012-77660A Patent Document 2: Japanese Unexamined Patent Application Publication No. 2012-47181A

SUMMARY OF INVENTION

Technical Problem

However, in the closed air cooling cycle cooling structure described in Patent Document 1, the passage structure (i.e. MT fin structure) of the cooling air passage 102A, which the bled pressurized air Ab flows through, from a bled pressurized air inlet hole 104a portion to a bled pressurized air outlet hole 104b portion is uniform despite differences in heat load. Accordingly, as illustrated in FIG. 7, the region near the bled pressurized air outlet hole 104b portion heats up, increasing the cooling air temperature, which in turn increases the metal temperature leading to a decrease in cooling performance.

In particular, as illustrated in FIGS. 8A to 8C, as the cooling air flows from the inlet of the cooling air passage 102A (I) toward the outlet (II) (see FIG. 8A), the cooling air temperature $T_C$ increases, and thus the metal temperature $T_m$ increases. In addition, the stress a locally increases at the outlet (II) portion due to the damping of the acoustic liner and the damper 103 (see FIG. 8B) and the low cycle fatigue life LCF locally drops to its lowest at the outlet (II) portion (see the region E of the lowest fatigue life portion in FIG. 8C).

Thus, in closed air cooling cycle cooling structures such as that described in Patent Document 1, there is a demand for the application of a passage structure (i.e. MT fin structure) capable of decreasing the metal temperature at locations with high heat load and low fatigue life such as the region near the bled pressurized air outlet hole 104b portion.

Patent Document 2 describes a gas turbine combustor comprising an inlet header disposed on the combustion gas downstream side of a wall portion of a tubular combustor basket for forming the flow of the combustion gas therein; a plurality of cooling passages formed in the wall portion side by side in the flow direction of the combustion gas, the plurality of cooling passages being connected to the inlet header; and a cooling air outlet portion disposed on the wall portion on the combustion gas upstream side, the cooling air outlet portion being connected to the plurality of cooling passages, wherein the cooling passages have a passage structure (i.e. MT fin structure) in which the cooling passages decrease in passage cross-sectional area in the flow direction of the cooling air, or the passage cross-sectional area of the cooling passages is substantially uniform and less cooling passages are disposed on the downstream side of the cooling air than on the upstream side of the cooling air.

Such a configuration allows localized increases in temperature at the wall portion of the gas turbine combustor along the flow direction of the combustion gas to be suppressed by increasing the flow rate of the cooling air flowing downstream through the cooling passage and thus increasing the heat transfer coefficient. In other words, as the cooling air flows downstream, the temperature of the cooling air increases due to heat transfer with the combustion gas. This reduces the difference in temperature between the combustion gas and the cooling air. The resulting decrease in cooling efficiency caused by the increased cooling air temperature is compensated by the increased heat transfer coefficient due to the increased flow rate of the cooling air.

Accordingly, such a cooling structure can be effectively applied to a closed air cooling cycle cooling structure such as that described above to help solve the problems described above.

The present invention has been made in light of such issues and an object of the present invention is to provide a gas turbine combustor including a cooling structure designed for optimized cooling performance derived from modifications to the structure of a cooling medium passage and a gas turbine provided with the same.

Solution to Problem

To achieve such an object, a gas turbine combustor of the present invention comprises a cooling medium inlet portion disposed on a combustion gas downstream side of an annular wall portion, a combustion gas flow being formable inside the wall portion;

a plurality of cooling medium passages connected to the cooling medium inlet portion, the plurality of cooling medium passages being disposed inside the wall portion side by side and aligned in a flow direction of the combustion gas;

a cooling medium outlet portion connected to the plurality of cooling medium passages, the cooling medium outlet portion being disposed on a combustion gas upstream side of the wall portion; wherein the plurality of cooling medium passages are divided via a passage transition groove portion into upstream cooling medium passages disposed closer to the cooling medium inlet portion and downstream cooling medium passages disposed closer to the cooling medium outlet portion; and center lines of the upstream cooling medium passages are non-collinear with center lines of the downstream cooling medium passages.

Additionally, the center lines of the upstream cooling medium passages and the center lines of the downstream cooling medium passages have a uniform pitch.

Additionally, the upstream cooling medium passages and the downstream cooling medium passages have identical passage widths, and each of the center lines of the downstream cooling medium passages is collinear with a midline equidistant from the center lines of adjacent upstream cooling medium passages.

To achieve such an object, a gas turbine of the present invention comprises the gas turbine combustor according to any one of the above;

a compressor that supplies compressed air to the combustor; and a turbine that is driven in rotation by combustion gas from the combustor.

Advantageous Effects of Invention

The gas turbine combustor according to the present invention utilizes the collision and separation of the cooling medium at the passage transition groove portion to the greatest extent and effectively increases the heat transfer coefficient, thus achieving cooling performance optimization. This allows cooling to be possible with a low cooling medium flow rate or a low pressure loss and improves cycle performance.

The gas turbine according to the present invention is a highly efficient gas turbine including the gas turbine combustor described above. By virtue of the gas turbine combustor, the combustion temperature and the turbine inlet temperature can be increased.

DESCRIPTION OF EMBODIMENTS

Hereinafter, embodiments of a gas turbine combustor and a gas turbine provided with the same according to the present invention will be described with reference to the drawings.

Embodiments

Figure 1A:
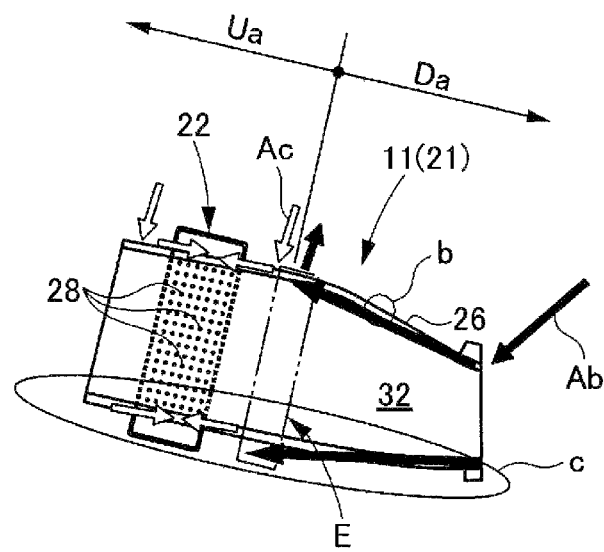
FIG. 1A is a schematic view of a closed air cooling cycle cooling structure of a combustor illustrating an embodiment of the present invention.
Figure 1B:
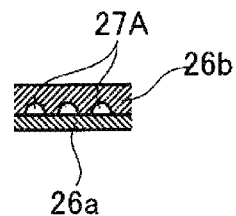
FIG. 1B is an explanatory diagram (enlarged view of portion b of FIG. 1A) illustrating a wall portion of the closed air cooling cycle cooling structure.
Figure 1C:
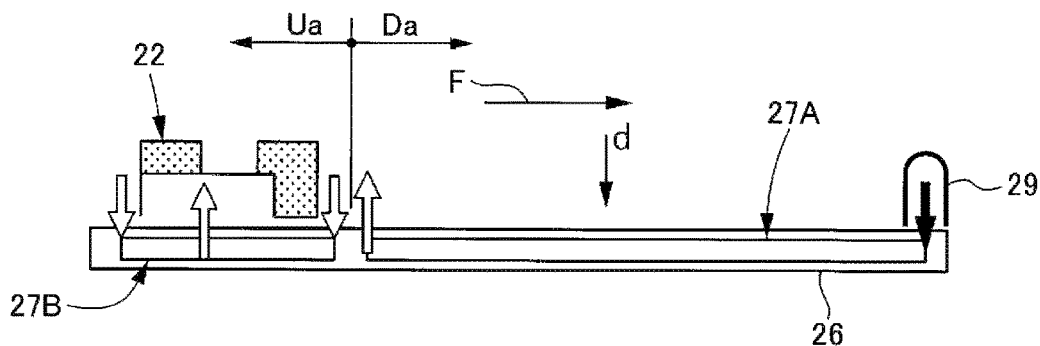
FIG. 1C is an explanatory diagram (enlarged view of portion c of FIG. 1A) illustrating the wall portion of the closed air cooling cycle cooling structure.
Figure 1D:
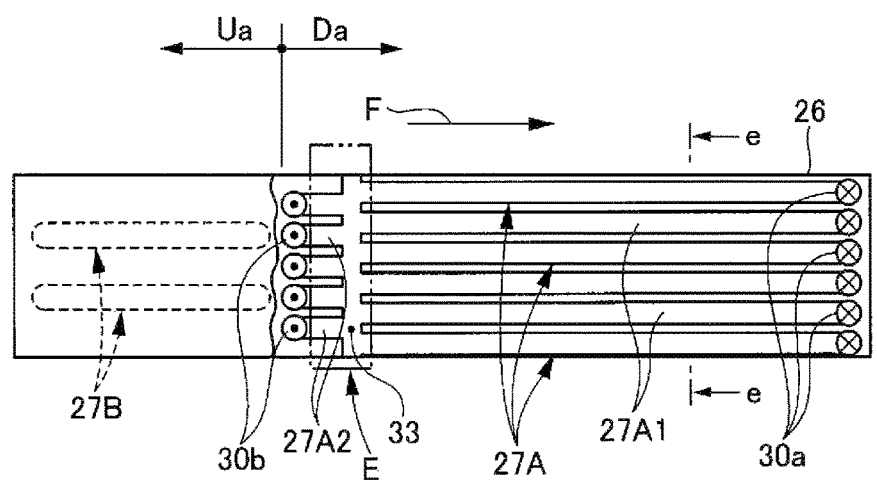
FIG. 1D is an explanatory diagram (diagram seen in the direction of arrow d of FIG. 1C) illustrating the wall portion of the closed air cooling cycle cooling structure.
Figure 1E:
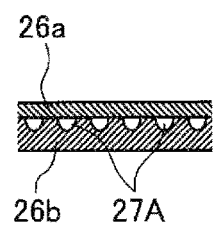
FIG. 1E is an explanatory diagram (cross-sectional view taken along line e-e in the direction of the arrows of FIG. 1D) illustrating the wall portion of the closed air cooling cycle cooling structure.
Figure 2A:
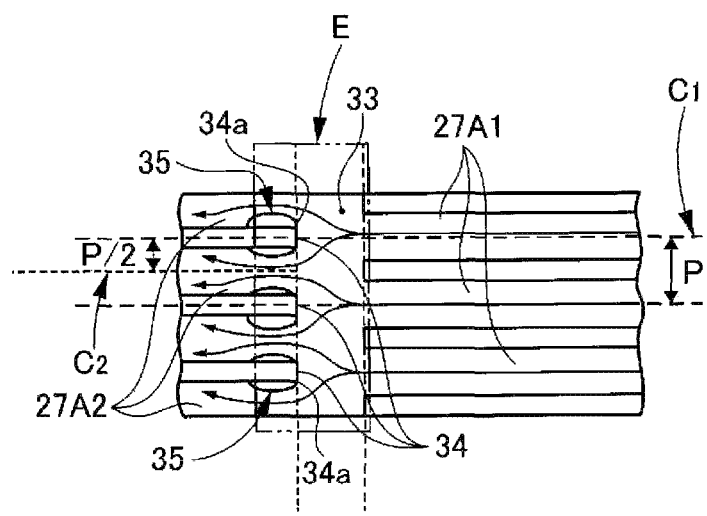
FIG. 2A is an explanatory diagram illustrating a passage transition groove portion.
Figure 2B:
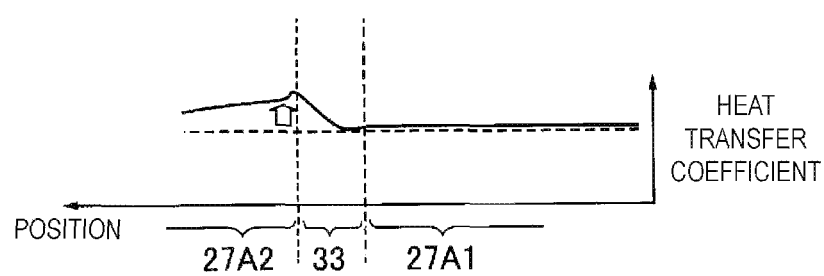
FIG. 2B is a graph illustrating the operational effects (heat transfer coefficient) of the passage transition groove portion.
Figure 2C:
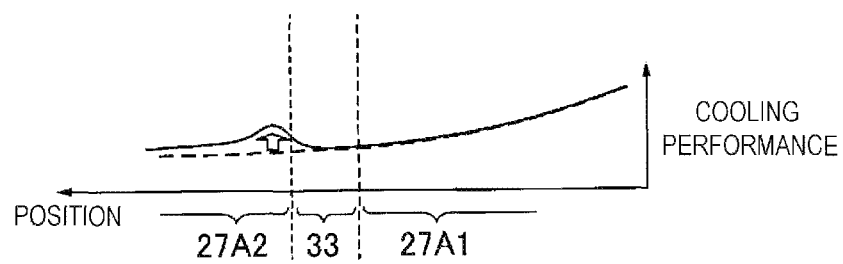
FIG. 2C is a graph illustrating the operational effects (cooling performance) of the passage transition groove portion.
Figure 3A:
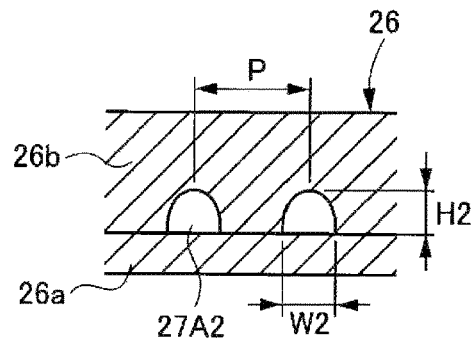
FIG. 3A is a cross-sectional view of a cooling air passage through which bled pressurized air flows.
Figure 3B:
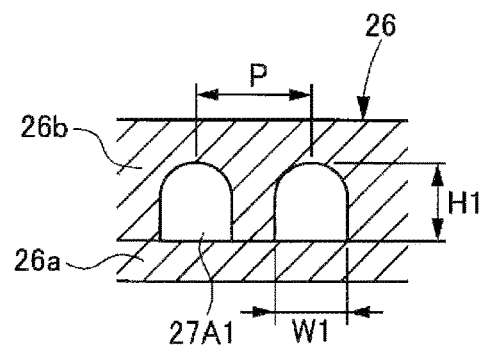
FIG. 3B is a cross-sectional view of the cooling air passage through which bled pressurized air flows.
Figure 4:
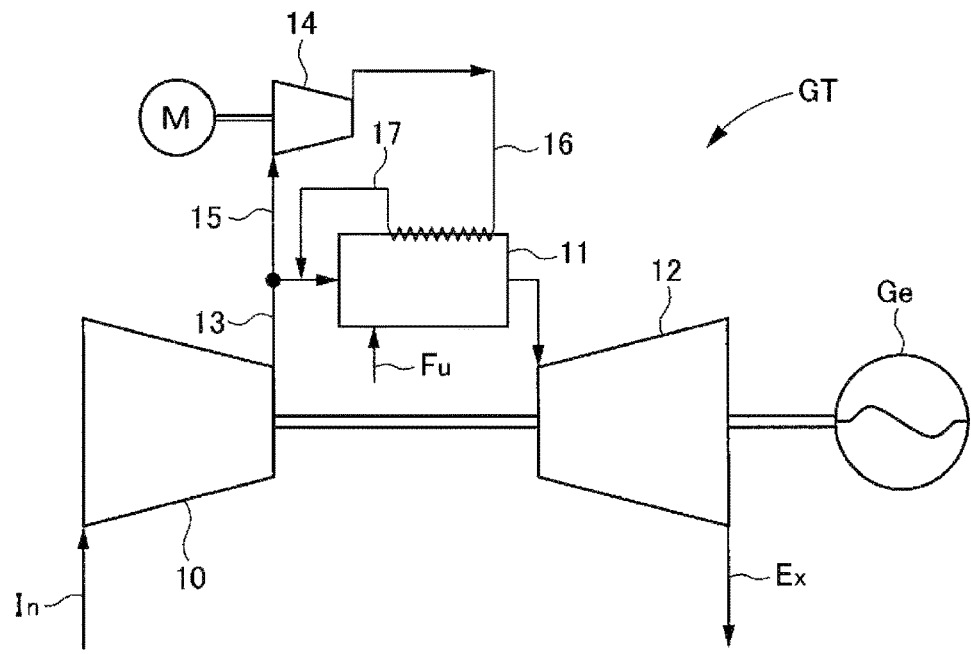
FIG. 4 is an explanatory diagram illustrating an example of the structure of a gas turbine provided with the combustor including the closed air cooling cycle cooling structure.
Figure 5:
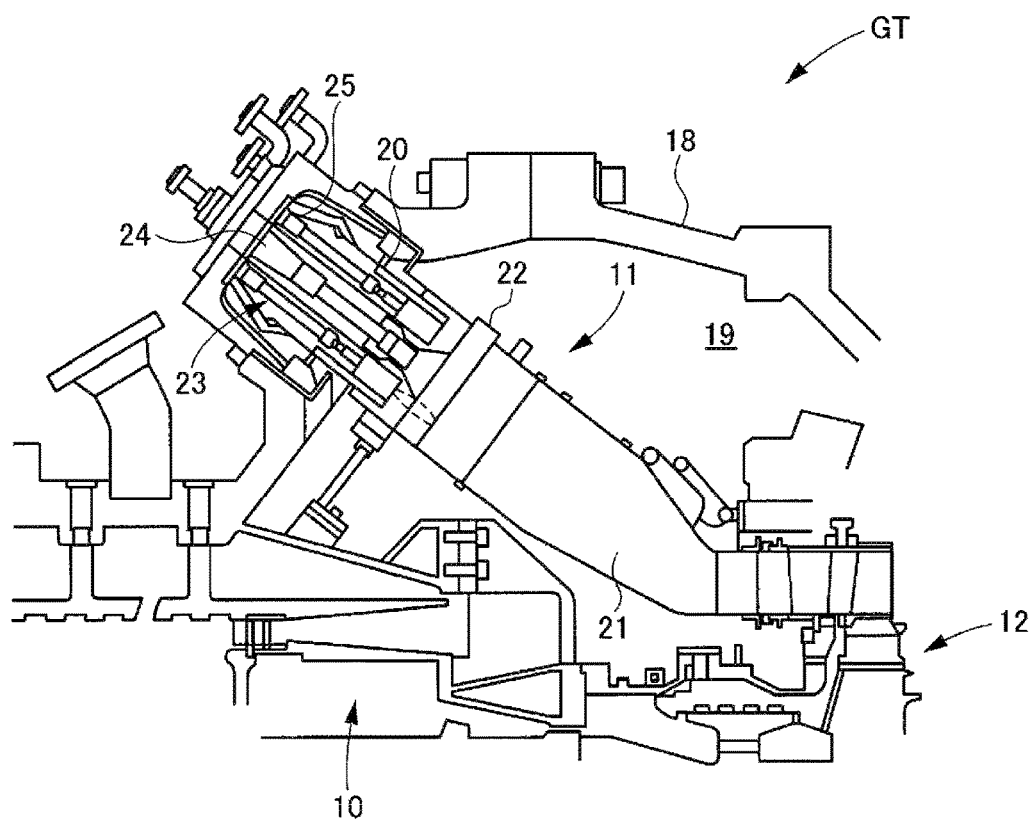
FIG. 5 is an explanatory diagram illustrating the structure of the combustor including the closed air cooling cycle cooling structure.
Figure 6A:
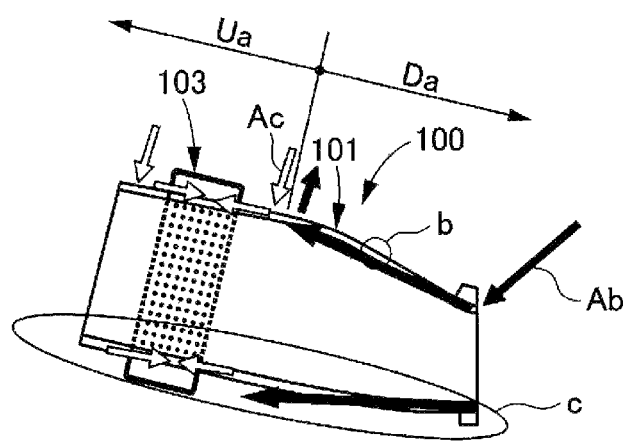
FIG. 6A is a schematic view of a closed air cooling cycle cooling structure of a conventional combustor.
Figure 6B:
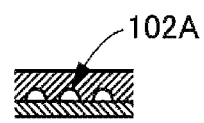
FIG. 6B is an explanatory diagram (enlarged view of portion b of FIG. 6A) illustrating a wall portion of the closed air cooling cycle cooling structure.
Figure 6C:
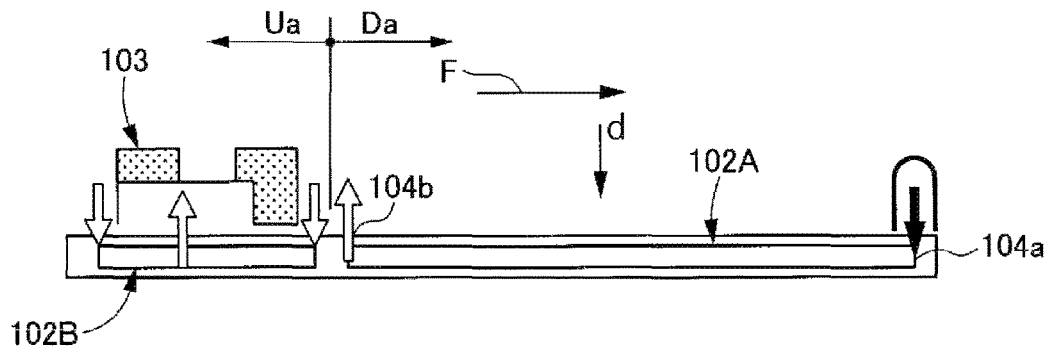
FIG. 6C is an explanatory diagram (enlarged view of portion c of FIG. 6A) illustrating the wall portion of the closed air cooling cycle cooling structure.
Figure 6D:
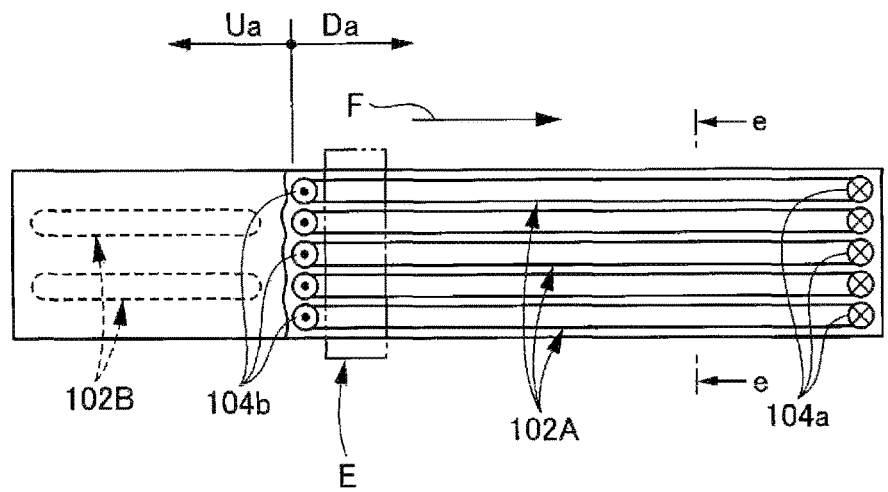
FIG. 6D is an explanatory diagram (diagram seen in the direction of arrow d of FIG. 6C) illustrating the wall portion of the closed air cooling cycle cooling structure.
Figure 6E:
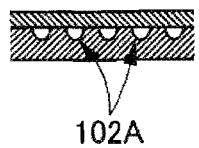
FIG. 6E is an explanatory diagram (cross-sectional view taken along line e-e in the direction of the arrows of FIG. 6D) illustrating the wall portion of the closed air cooling cycle cooling structure.
Figure 7:
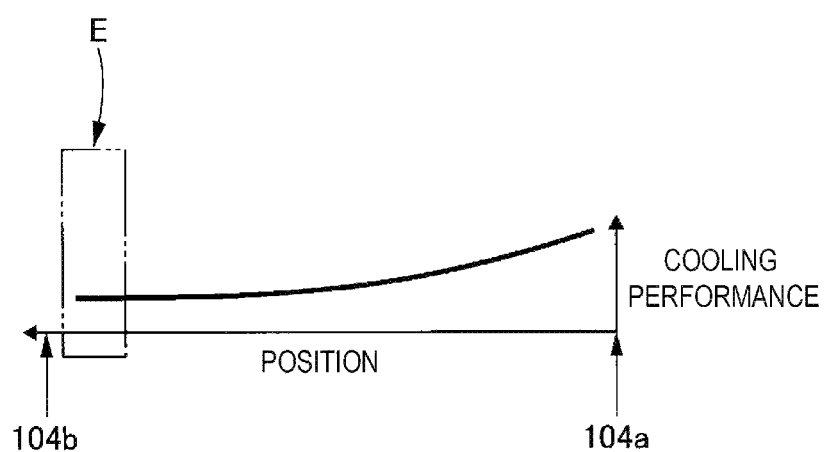
FIG. 7 is a graph illustrating the cooling performance.
Figure 8A:
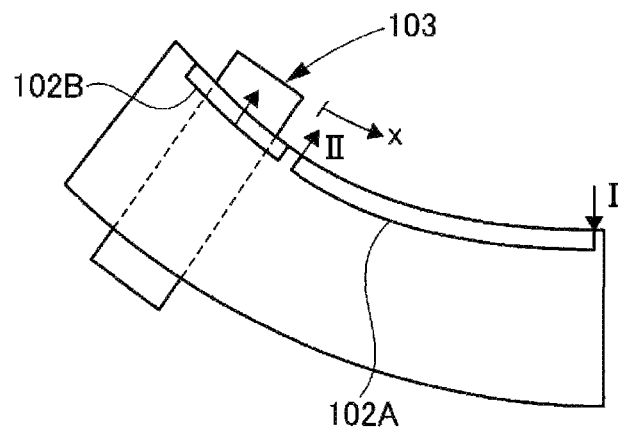
FIG. 8A is a schematic view of the structure of a transition piece for explaining problems in the closed air cooling cycle.
Figure 8B:
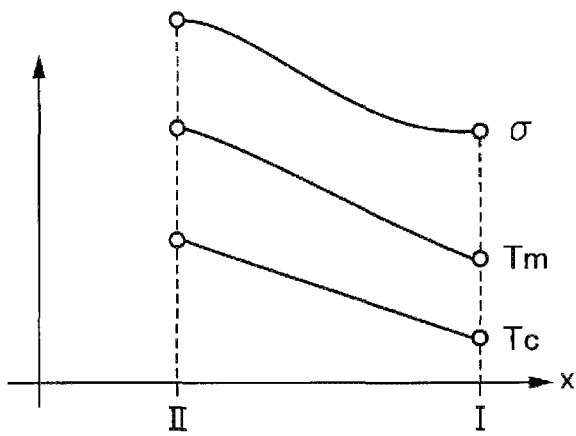
FIG. 8B is a relationship graph of the stress, metal temperature, and cooling air temperature for explaining the problems in the closed air cooling cycle.
Figure 8C:
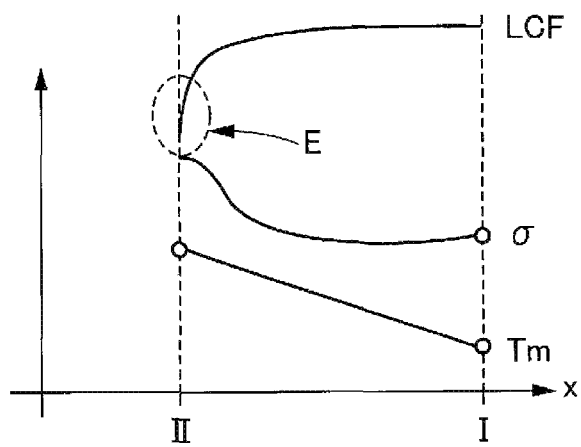
FIG. 8C is a relationship graph of the low cycle fatigue life, stress, metal temperature for explaining the problems in the closed air cooling cycle.

FIGS. 1A to 1E are explanatory diagrams of a closed air cooling cycle cooling structure of a combustor, which is an embodiment of the present invention. FIGS. 2A to 2C are explanatory diagrams of the structure and operational effects of a passage transition groove portion. FIG. 3A and FIG. 3B are cross-sectional views of cooling air passages through which bled pressurized air flows. FIG. 4 is an explanatory diagram illustrating an example of the structure of a gas turbine provided with the combustor including the closed air cooling cycle cooling structure. FIG. 5 is an explanatory diagram illustrating the structure of the combustor including the closed air cooling cycle cooling structure.

As illustrated in FIG. 4, a gas turbine GT includes a compressor 10, a combustor 11, and a turbine 12. The turbine 12 is coupled to a generator Ge.

The compressor 10 compresses air In taken in from the atmosphere. The main flow of this compressed air is supplied to the combustor 11 through a compressed air supply passage 13. The combustor 11 combusts fuel Fu using the compressed air compressed at the compressor 10 to produce high-temperature high-pressure combustion gas. This combustion gas is supplied to the turbine 12. The turbine 12 includes a plurality of vanes and blades alternately disposed inside the turbine casing. In the turbine 12, the combustion gas passes through the plurality the vanes and blades and rotates a rotor to which the blades are attached, which generates driving force for the generator Ge and discharges exhaust gas Ex from the turbine 12.

The gas turbine GT described above also includes a pressurizing device 14. The pressurizing device 14 bleeds a portion of the compressed air compressed at the compressor 10 to pressurize the compressed air to a higher pressure. The pressurizing device 14 is provided on a branched passage 15 and is driven by an electric motor M. The branched passage 15 branches from the compressed air supply passage 13 partway along and bleeds a portion of the compressed air.

The bled pressurized air pressurized at the pressurizing device 14 is supplied to the combustor 11 through a pressurized air passage 16 and is used as cooling air for cooling the wall of the combustor 11. The bled pressurized air used to cool the wall of the combustor 11 as such is then returned to the compressed air supply passage 13 through a return passage 17 where the returned bled pressurized air merges with the main flow of the compressed air flowing through the compressed air supply passage 13. Thereafter, the bled pressurized air is reused as combustion air for the combustion of fuel Fu at the combustor 11.

In such a manner, the gas turbine GT described above includes a recovery type air cooling structure, i.e. a closed air cooling cycle cooling structure in which the compressed air supplied from the compressor 10 is bled from the upstream side of the combustor 11 and pressurized, this bled pressurized air is used as cooling air for the combustor wall, and thereafter this bled pressurized air is recovered and reused as combustion air for the combustion of the fuel in the combustor 11 together with the main flow of the compressed air.

The combustor 11 has a substantially cylindrical shape, and, for example, as illustrated in FIG. 5, is disposed in a casing inner space 19 defined inside the casing 18 of the gas turbine GT. A plurality of these combustors 11 is disposed in the circumferential direction to surround the periphery of the rotor.

The combustor 11 includes a combustor basket 20, a transition piece 21, and an acoustic liner and damper 22. A combustion burner 23 is disposed inside the combustor basket 20. The combustion burner 23 includes a pilot burner 24 centrally disposed, and a plurality of main burners 25 disposed to surround the periphery of the pilot burner 24. Note that the casing inner space 19 in the casing 18 in which the combustor 11 is disposed is filled with the compressed air compressed at and introduced from the compressor 10.

The compressed air introduced into the casing inner space 19 flows in from an upstream portion of the combustor 11 (the side closer to the combustion burner 23) into the combustor basket 20 where the compressed air mixes with the fuel supplied from the combustion burner 23 and combusts. The high-temperature high-pressure combustion gas produced by this combustion is supplied downstream through the transition piece 21 to the turbine 12.

This combustor 11 of the gas turbine GT, as illustrated in FIGS. 1A to 1E, includes a wall portion 26 of the transition piece 21 that is wall cooled by cooling air being supplied to an internally formed cooling air passage. This wall portion 26 is divided into two regions: a downstream wall region Da closer to the turbine, which is cooled by passing bled pressurized air Ab as cooling air (a cooling medium) through cooling air passages (cooling medium passages) 27A from the downstream side to the upstream side of the combustion gas flow F; and an upstream wall region Ua closer to the burner, which is cooled by passing bled compressed air Ac, which is bled from the main flow of the compressed air flowing through the casing inner space 19, as cooling air through cooling air passages 27B to an acoustic liner and a damper 22.

In the example illustrated in the drawings, the wall portion 26 forming the transition piece 21 in the downstream wall region Da has a double wall structure including an inner wall 26a and an outer wall 26b that are brazed together. When joined together, the inner wall 26a and grooves formed in the outer wall 26b, which is the thicker of the two, extending in the axial direction (longitudinal direction) of the combustor 11 form the cooling air passages 27A described above. The cooling air passages 27A are disposed proximate to each other, side by side in the circumferential direction of the combustor 11.

Additionally, in the downstream wall region Da, the bled pressurized air Ab introduced from the region near a rear end portion of the transition piece 21 flows through the cooling air passages 27A and exits into the casing inner space 19 from the region near an end portion of the acoustic liner and damper 22 closer to the turbine 12. Specifically, the bled pressurized air Ab flows through the pressurized air passage 16 and is introduced into a manifold 29 disposed in the region near the rear end portion of the transition piece 21. A bled pressurized air inlet hole (cooling medium inlet portion) 30a is provided on the inner side of the manifold 29 for each of the passages. The bled pressurized air inlet holes 30a correspond to inlet apertures of the cooling air passages 27A in the wall portion 26 through which the bled pressurized air Ab flows.

Bled pressurized air outlet holes (cooling medium outlet portions) 30b corresponding to outlet apertures of the cooling air passages 27A open to the turbine 12 side of the acoustic liner and damper 22 at a region near the end portion closer to the turbine 12 of the acoustic liner and damper 22. Accordingly, the bled pressurized air Ab introduced from the bled pressurized air inlet holes 30*a* inside the manifold 29 flows through the cooling air passages 27A toward the acoustic liner and damper 22 and cools the wall portion 26. The bled pressurized air Ab, with its temperature now increased, exits into the casing inner space 19 from the bled pressurized air outlet holes 30*b*. The high temperature bled pressurized air Ab that has exited into the casing inner space 19 merges with the compressed air filling the casing inner space 19 and is reused as combustion air.

In the upstream wall region Ua, the compressed air inside the casing inner space 19 is bled from the region near the end portion of the acoustic liner and damper 22 closer to the turbine 12 and the region near the end portion closer to the burner 23. This bled compressed air Ac flows through the cooling air passages 27B and exits into a liner portion of the acoustic liner and damper 22. In other words, after the bled compressed air Ac flows through the cooling air passages 27B, cools the wall portion 26 at the region near the acoustic liner and damper 22, increases in temperature, and exits into the liner portion of the acoustic liner and damper 22, the bled compressed air Ac exits into a combustion chamber 32 of the combustor 11 and is used in combustion.

Additionally, in the present embodiment, as illustrated in FIG. 2A, the cooling air passages 27A through which the bled pressurized air flows have the same passage width and are disposed at a uniform pitch in the circumferential direction. At region E of lowest fatigue life, which corresponds to the location where stress is concentrated, all of the cooling air passages 27A are divided into upstream cooling air passages (upstream cooling medium passages) 27A1 and downstream cooling air passages (downstream cooling medium passage) 27A2 via an annular passage (pitch) transition groove portion (also referred to as "flow-merging header") 33; and MT fin passage center lines $C_2$ of the downstream cooling air passages 27A2 are offset in the circumferential direction of the combustor 11 with respective to MT fin passage center lines $C_1$ of the upstream cooling air passages 27A1 by, for example, a half pitch (P/2). In other words, each of the passage center lines $C_2$ of the downstream cooling air passages 27A2 are collinear with a midline equidistant from the passage center lines $C_1$ of adjacent upstream cooling air passages 27A1. In such a manner, a transition between the passages occurs at the passage transition groove portion 33. Upon transition between the passages, the cooling air collides with MT fin inlet end portions 34.

Additionally, the MT fin inlet end portions 34 of the downstream cooling air passages 27A2 are provided with sharp edges 34*a* so that at the inlet portion of the downstream cooling air passages 27A2, active separation of the bled pressurized air occurs (see the region denoted by reference sign 35 in the drawings).

Such a configuration allows wall cooling using the bled pressurized air to be performed at the downstream wall region Da by the collision and separation of the cooling air and wall cooling using the bled compressed air to be performed at the upstream wall region Ua. Thus, wall cooling using the bled pressurized air in a comparatively low temperature state can be performed at the side (downstream wall region Da) closer to the turbine 12 of the transition piece 21 of the combustor 11 that reaches relatively high temperatures; and wall cooling using the bled compressed air can be performed at the side (upstream wall region Ua) closer to the combustion burner 23 of the transition piece 21 of the combustor 11 that reaches relatively low temperatures.

The cooling air used for cooling the wall of the combustor 11, namely both the bled pressurized air and the bled compressed air, can be reused as combustion air. This enables wall cooling of the combustor 11 to be performed efficiently and the reduction in emissions of nitrogen oxide produced by combustion.

In the present embodiment, the cooling air passages 27A described above are all divided into the upstream cooling air passages 27A1 and the downstream cooling air passages 27A2 via the passage transition groove portion 33, and the passage center lines $C_2$ of the downstream cooling air passages 27A2 are offset (shifted) in the circumferential direction of the combustor 11 with respective to the passage center lines $C_1$ of the upstream cooling air passages 27A1 by, for example, a half pitch (P/2).

Upon transition between the upstream cooling air passages 27A1 to the downstream cooling air passages 27A2, the collision and separation at the MT fin inlet end portions 34 results in effective cooling. This separation allows the boundary layer of the bled pressurized air at the inlet portion of the downstream cooling air passages 27A2 to be formed as thin as possible. Note that forming a thin boundary layer of the bled pressurized air at the inlet portion of the downstream cooling air passages 27A2 without the transition to the downstream cooling air passages 27A2 is also possible with a configuration in which the passage transition groove portion (in this case more accurately referred to as the flow-merging header) 33 is simply disposed.

Additionally, the present embodiment includes sharp edges 34*a* on the MT fin inlet end portions 34 of the downstream cooling air passages 27A2. Thus, active separation of the bled pressurized air occurs at the inlet portion of the downstream cooling air passages 27A2.

As a result, with a simple modification to the passage structure, the collision and separation at the passage transition groove portion 33 is utilized to the greatest extent to effectively increase the heat transfer coefficient on the cooling side (see FIG. 2B). Accordingly, optimization of the cooling performance can be achieved, and, because cooling is possible with a low bled pressurized air flow rate or a low pressure loss, the performance of the closed air cooling cycle can be improved (see FIG. 2C).

Additionally, the present embodiment may have a configuration, as illustrated in FIG. 3A and FIG. 3B, in which the downstream cooling air passages 27A2 (see FIG. 3A) have the passage width W2 and passage height H2, which are less than the passage width W1 and passage height H1 of the upstream cooling air passages 27A1 (see FIG. 3B), thus giving the downstream cooling air passages 27A2 less effective cross-sectional area than the upstream cooling air passages 27A1.

Accordingly, in addition to the cooling effect of the collision and separation due to the passage transition described above, the increase in the flow rate of the bled pressurized air in the downstream cooling air passages 27A2 can achieve an increase in the heat transfer coefficient.

The present invention is not limited to the embodiment described above, and as long as the spirit of the present invention is maintained, for example, the number of downstream cooling air passages 27A2 may be less than the upstream cooling air passages 27A1 or the pitch of the passage center line $C_2$ may be changed. Furthermore, the present invention is not limited to the application to a closed air cooling cycle cooling structure and can be applied to other cooling structures.

INDUSTRIAL APPLICABILITY

The gas turbine combustor and gas turbine provided with the same according to the present invention can provide a highly efficient gas turbine and is thus suitable for application to a thermal power plant.

REFERENCE SIGNS LIST

10 Compressor
11 Combustor
12 Turbine
13 Compressed air supply passage
14 Pressurizing device
15 Branched passage
16 Pressurized air passage
17 Return passage
18 Casing
19 Casing inner space
20 Combustor basket
21 Transition piece
22 Acoustic liner and damper
23 Combustion burner
24 Pilot burner
25 Main burner
26 Wall portion
26a Inner wall
26b Outer wall
27A Cooling air passage through which bled pressurized air flows
27A1 Upstream cooling air passage (cooling medium passage)
27A2 Downstream cooling air passage (cooling medium passage)
27B Cooling air passage through which bled compressed air flows
30a Bled pressurized air inlet hole (cooling medium inlet portion)
30b Bled pressurized air outlet hole (cooling medium outlet portion)
32 Combustion chamber
33 Passage (pitch) transition groove portion (flow-merging header)
34 MT fin inlet end portion
34a Sharp edge
35 Region of separation
GT Gas turbine
Ge Generator
Fu Fuel
In Air
Ex Exhaust gas
F Flow of combustion gas
Ua Upstream wall region
Da Downstream wall region
Ab Bled pressurized air
Ac Bled compressed air
E Region of lowest fatigue life
$C_1$ MT fin passage center line of upstream cooling air passage
$C_2$ MT fin passage center line of downstream cooling air passage
P Pitch (spacing between MT fin center lines of cooling air passages through which bled pressurized air flows)
W Passage width of upstream cooling air passages and downstream cooling air passages
H1 Passage height of upstream cooling air passages
H2 Passage height of downstream cooling air passages

The invention claimed is:

1. A gas turbine combustor comprising:
a cooling medium inlet portion disposed on a combustion gas downstream side of an annular wall portion, a combustion gas flow being formable inside the annular wall portion;
a plurality of cooling medium passages connected to the cooling medium inlet portion, the plurality of cooling medium passages being disposed inside the annular wall portion side by side and aligned in a flow direction of the combustion gas;
a cooling medium outlet portion connected to the plurality of cooling medium passages, the cooling medium outlet portion being disposed on a combustion gas upstream side of the wall portion; wherein
the plurality of cooling medium passages are fluidly connected and divided via a passage transition groove portion into upstream cooling medium passages disposed closer to the cooling medium inlet portion and downstream cooling medium passages disposed closer to the cooling medium outlet portion; and
center lines of the upstream cooling medium passages are non-collinear with center lines of the downstream cooling medium passages.

2. The gas turbine combustor according to claim 1, wherein the center lines of the upstream cooling medium passages and the center lines of the downstream cooling medium passages have a uniform pitch.

3. The gas turbine combustor according to claim 1, wherein
the upstream cooling medium passages and the downstream cooling medium passages have identical passage widths, and
each of the center lines of the downstream cooling medium passages is collinear with a midline equidistant from the center lines of adjacent upstream cooling medium passages.

4. A gas turbine comprising:
the gas turbine combustor according to claim 1;
a compressor that supplies compressed air to the gas turbine combustor; and
a turbine that is driven in rotation by the combustion gas flow from the gas turbine combustor.

* * * * *